United States Patent
Lahti et al.

(10) Patent No.: US 9,750,020 B2
(45) Date of Patent: Aug. 29, 2017

(54) CARRIER AGGREGATION WITH TUNABLE ANTENNAS

(71) Applicants: Saku Lahti, Tampere (FI); Petri T. Mustonen, Tampere (FI); Jukka Leppänen, Pirkkala (FI); Mikko S. Komulainen, Tampere (FI)

(72) Inventors: Saku Lahti, Tampere (FI); Petri T. Mustonen, Tampere (FI); Jukka Leppänen, Pirkkala (FI); Mikko S. Komulainen, Tampere (FI)

(73) Assignee: Intel Corporation, Santa Clara, CA (US)

( * ) Notice: Subject to any disclaimer, the term of this patent is extended or adjusted under 35 U.S.C. 154(b) by 331 days.

(21) Appl. No.: 14/227,480

(22) Filed: Mar. 27, 2014

(65) Prior Publication Data
US 2015/0282170 A1 Oct. 1, 2015

(51) Int. Cl.
| | |
|---|---|
| H04W 4/00 | (2009.01) |
| H04W 72/04 | (2009.01) |
| H01Q 21/30 | (2006.01) |
| H04B 7/0404 | (2017.01) |
| H01Q 21/28 | (2006.01) |
| H04B 1/00 | (2006.01) |

(52) U.S. Cl.
CPC ........ *H04W 72/0453* (2013.01); *H01Q 21/28* (2013.01); *H01Q 21/30* (2013.01); *H04B 1/0064* (2013.01); *H04B 7/0404* (2013.01)

(58) Field of Classification Search
None
See application file for complete search history.

(56) References Cited

U.S. PATENT DOCUMENTS

| | | | |
|---|---|---|---|
| 6,917,790 B1 | 7/2005 | Braun et al. | |
| 8,614,646 B2 | 12/2013 | Zhang et al. | |
| 2007/0049213 A1* | 3/2007 | Tran | H01Q 9/145 |
| | | | 455/78 |
| 2007/0285326 A1 | 12/2007 | McKinzie | |
| 2011/0103243 A1 | 5/2011 | Larsson et al. | |
| 2013/0230080 A1* | 9/2013 | Gudem | H04B 1/0057 |
| | | | 375/219 |
| 2013/0244722 A1 | 9/2013 | Rousu et al. | |
| 2013/0336242 A1* | 12/2013 | Rajagopal | H04W 72/0453 |
| | | | 370/329 |
| 2014/0044021 A1 | 2/2014 | Alberth, Jr. et al. | |

(Continued)

FOREIGN PATENT DOCUMENTS

WO WO-2013/191442 A1 12/2013

OTHER PUBLICATIONS

German Office Action dated Aug. 25, 2015 for German Patent Application No. 102015101800.4 (with English translation).

(Continued)

*Primary Examiner* — Minh-Trang Nguyen
(74) *Attorney, Agent, or Firm* — Schiff Hardin LLP

(57) ABSTRACT

A wireless device having a first tunable antenna tuned to a first frequency band; and a second tunable antenna tuned to a second frequency band that is different than the first frequency band, wherein the first and second antennas are configured to transmit, receive, or a combination of transmit and receive transmission signals by carrier aggregation at the respective first and second frequency bands simultaneously.

16 Claims, 4 Drawing Sheets

(56) References Cited

U.S. PATENT DOCUMENTS

| | | | |
|---|---|---|---|
| 2014/0185498 A1* | 7/2014 | Schwent | H04B 1/0057 370/297 |
| 2015/0162897 A1* | 6/2015 | Zachara | H01Q 21/28 455/77 |
| 2015/0177277 A1* | 6/2015 | Nickel | G01R 31/3025 324/629 |
| 2015/0188582 A1* | 7/2015 | Kahrizi | H04B 1/0067 455/77 |

OTHER PUBLICATIONS

Office Action dated May 23, 2016 for Taiwan Patent Application No. 104104745 (with English translation).

* cited by examiner

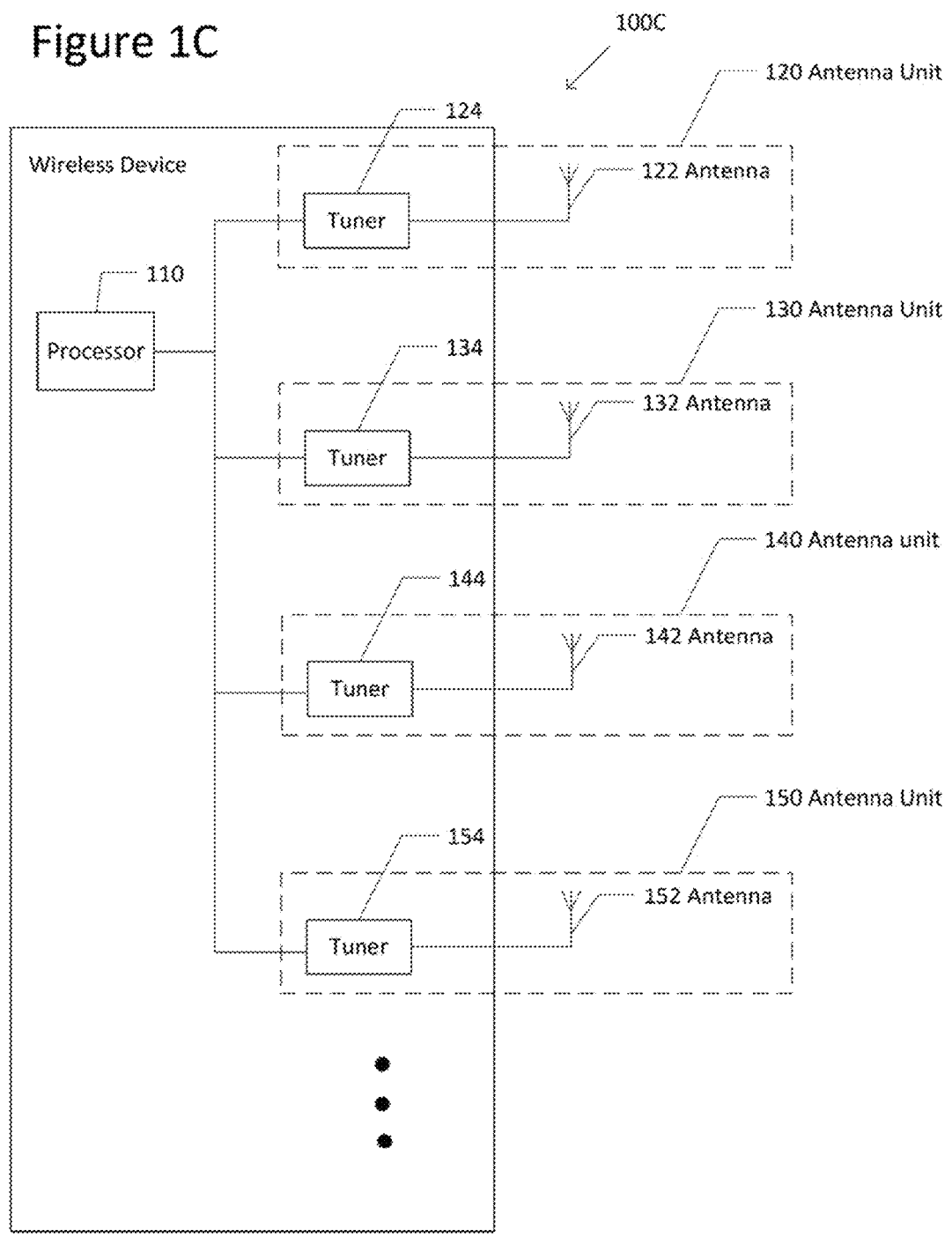

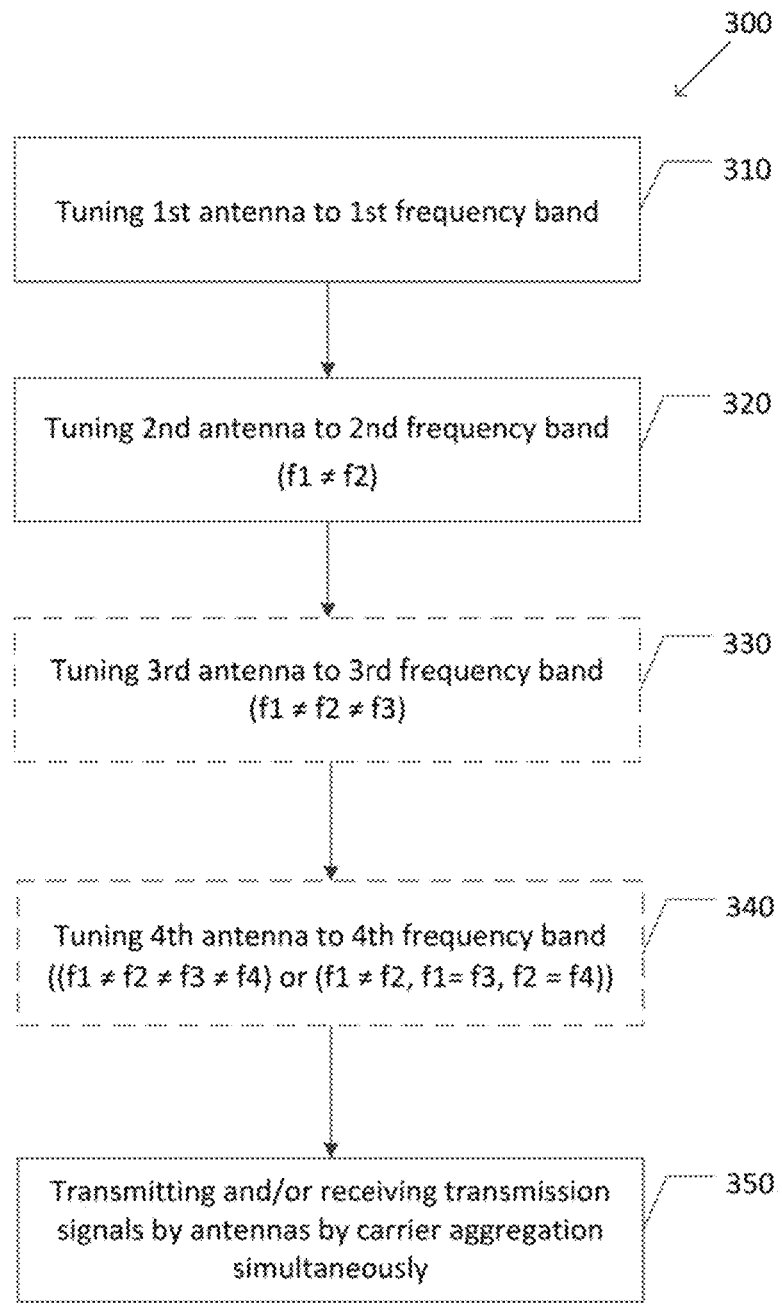

CARRIER AGGREGATION WITH TUNABLE ANTENNAS

TECHNICAL FIELD

The present disclosure generally relates to a wireless device and method for performing carrier aggregation with tunable antennas.

BACKGROUND

In modern antenna design, antenna size can be minimized by tuning an antenna according to an active radio frequency (RF) band. Antenna performance is thus optimized to cover only a specific RF band at a time.

Carrier aggregation improves data transmission speeds in the downlink (and more recently in the uplink) by using two RF bands simultaneously. Carrier aggregation requiring simultaneous operation in two frequency bands is problematic for tunable antennas because there needs to be a compromise between the two frequency bands.

One solution is to use passive antennas that cover the required RF bands. Such an antenna, however, would need to be large, thereby competing with customer demands for the wireless device to be as small as possible.

BRIEF DESCRIPTION OF THE DRAWINGS

FIGS. 1A-1C illustrate schematic diagrams of examples wireless devices having tunable antennas with carrier aggregation optimization.

FIG. 3 illustrates a flowchart of examples of methods of optimizing carrier aggregation performance in wireless devices having tunable antennas.

DESCRIPTION OF THE EMBODIMENTS

The present disclosure generally relates to a wireless device and method for optimizing data transmission and/or reception with carrier aggregation by using tunable antennas. A first antenna is tuned to a first frequency band and a second antenna is tuned to a second frequency band that is different than the first frequency band. The first and second antennas then transmit and/or receive transmission signals by carrier aggregation at the respective first and second frequency bands simultaneously.

Figure 1A:
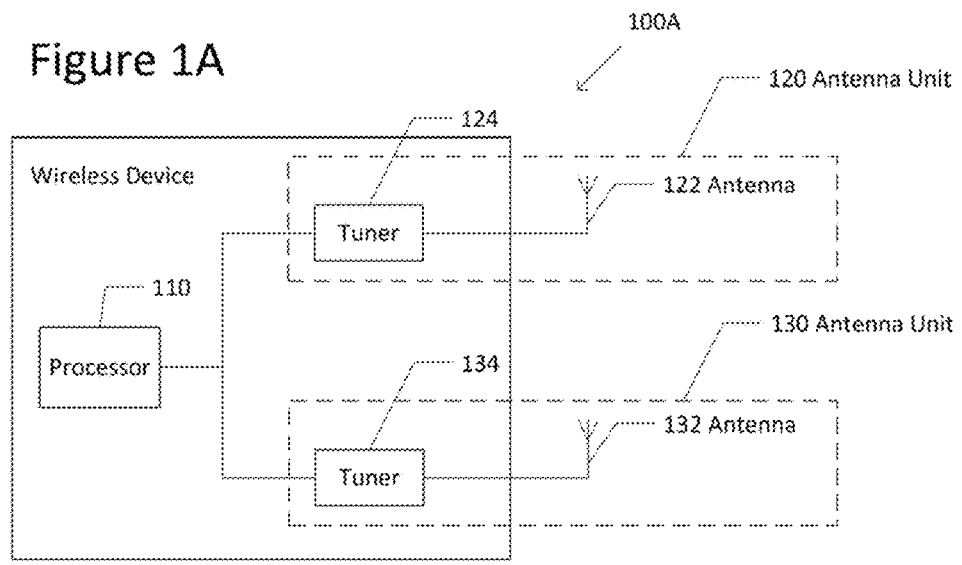
Figure 1B:
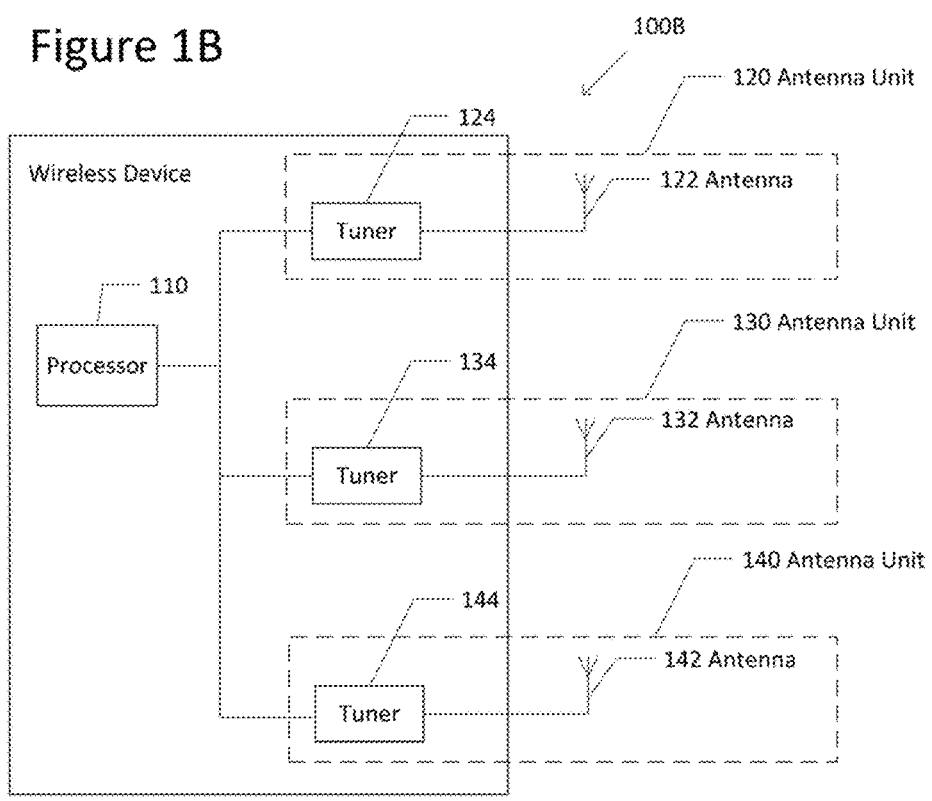

FIGS. 1A-1C illustrate schematic diagrams of examples wireless devices having tunable antennas with carrier aggregation optimization.

FIG. 1A illustrates a schematic diagram of an example of a wireless device 100A having processor 110 and first and second antenna units 120, 130. First antenna unit 120 has antenna 122 and antenna tuner 124. Likewise, second antenna unit 130 has antenna 132 and antenna tuner 134.

The first antenna 122 is tuned by antenna tuner 124 to a first frequency band (f1). The second antenna 132 is tuned by antenna tuner 134 to a second frequency band (f2) that is different from the first frequency band (f1). The first antenna 122 and the second antenna 132 transmit and/or receive transmission signals with carrier aggregation at the respective first and second frequency bands (f1, f2) simultaneously. The carrier aggregation for the downlink (reception) or the uplink (transmission) directions is performed by the processor 110.

The first antenna 122 is sometimes known as the primary antenna and the second antenna 132 as the secondary antenna, but this is just a matter of semantics. Historically the primary antenna was configured to both transmit and/or receive transmission signals, whereas the secondary was configured only to receive transmission signals; this is known as downlink carrier aggregation. Alternatively, the primary antenna may be configured to both transmit and/or receive transmission signals, whereas the secondary configured only to transmit transmission signals; this is known as uplink carrier aggregation. However, the disclosure is not limited in this respect. Each of the primary (first) and secondary (second) antennas may be configured to transmit and/or receive transmission signals.

FIG. 1B illustrates a schematic diagram of an example of a wireless device 100B having tunable first, second and third antennas 122, 132, 142. Like reference numerals from FIG. 1A are substantially similar, and this for the sake of brevity, their descriptions will not be repeated. A main difference between wireless device 100A of FIG. 1A and wireless device 100B of FIG. 1B is that wireless device 100B includes a third antenna unit 140, which has antenna 142 and antenna tuner 144.

The third antenna 142 is tuned by an antenna tuner 144 to a third frequency band (f3) that is different from each of the first and second frequency bands (f1 and f2). The first, second and third antennas 122, 132, 142 are configured to transmit and/or receive transmission signals with carrier aggregation at the respective first, second and third frequency bands (f1, f2, f3) simultaneously.

FIG. 1C illustrates a schematic diagram of an example of a wireless device 100C having tunable first, second, third and fourth antennas 122, 132, 142, 152. Like reference numerals from FIGS. 1A and 1B are substantially similar, and this for the sake of brevity, their descriptions will not be repeated. A main difference between wireless device 100B of FIG. 1B and wireless device 100C of FIG. 1C is that wireless device 100C includes a fourth antenna unit 150 having a fourth antenna 152 and antenna tuner 154.

The fourth antenna 152 is tuned by an antenna tuner 154 to a fourth frequency band (f4) that is different of each of the first, second and third frequency bands (f1, f2, f3). The first, second, third and fourth antennas 122, 132, 142, 152 are configured to transmit and/or receive transmission signals by carrier aggregation at the respective first, second, third and fourth frequency bands (f1, f2, f3, f4) simultaneously.

Alternatively, the third antenna 142 may be tuned to the first frequency band (f1), and the fourth antenna 152 tuned to the second frequency band (f2). The first and third antennas 122, 142 in this case are configured to transmit and/or receive transmission signals at the first frequency band (f1), and the second and fourth antennas 132, 152 are configured to transmit and/or receive transmission signals at the second frequency band (f2), by carrier aggregation simultaneously.

The disclosure is not limited to four antennas or four frequency bands. For example, there could be eight antennas. Alternatively, there could be four antennas with one antenna tuned to one frequency band and the other three antennas tuned to a second frequency band. There may be any number of antennas and/or frequency bands in any combination as suitable for a particular wireless application.

The antenna tuners 124, 134, 144, 154 of FIGS. 1A-1C may be configured to tune their respective antennas statically or dynamically.

Figure 2:
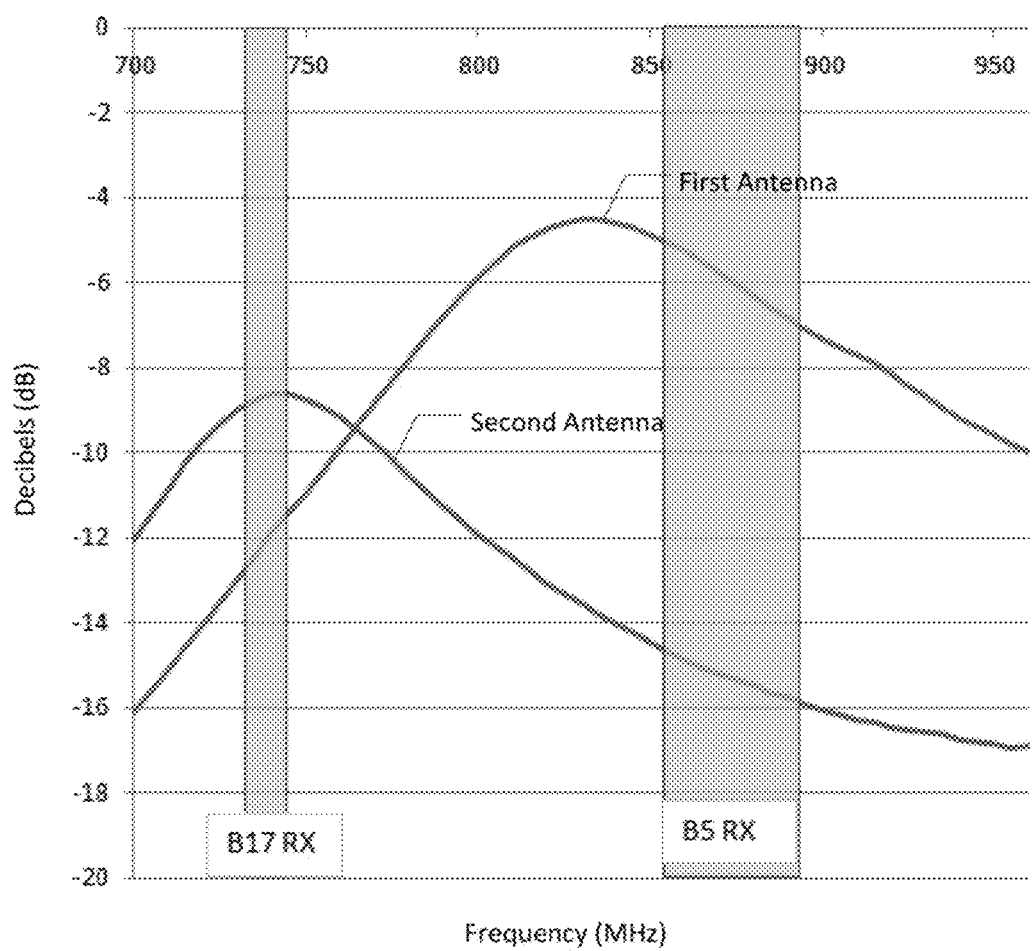
FIG. 2 illustrates a graph of example antenna efficiencies in two bands in the case of carrier aggregation.

FIG. 2 illustrates a graph of antenna performance efficiencies in two bands, for example, Band 5 and Band 17, in the case of carrier aggregation. The graph is decibels (dB) versus frequency (MHz). Band 5 is the first antenna tuned to around the 850 MHz frequency range, Band 17 is the second antenna tuned to around the 700 MHz frequency range. By tuning the first and second antennas to the B5 and B17 frequency bands, respectively, it can be seen in the graph that is possible to optimize the performance of the transceiver during carrier aggregation at each of the two frequency bands.

FIG. 3 illustrates a flowchart of examples of methods of optimizing carrier aggregation performance in wireless devices having tunable antennas.

At Step 310, a first antenna 122 of wireless device 100 is tuned to a first frequency band (f1).

At Step 320, a second antenna 132 is tuned to a second frequency band (f2) that is different than the first frequency band (f1).

Then, at Step 350, first and second antennas 122, 132 transmit and/or receive transmission signals at the respective first and second frequency bands (f1, f2) with carrier aggregation simultaneously.

Optionally, at Step 330, a third antenna 142 is tuned to a third frequency band (f3) that is different from each of the first and second frequency bands (f1, f2). At 350, the first, second and third antennas 122, 132, 142 transmit and/or receive transmission signals at the respective first, second and third frequency bands (f1, f2, f3) by carrier aggregation simultaneously.

Optionally, at Step 340, a fourth antenna 118 is tuned to a fourth frequency band (f4) that is different from each of the first, second and third frequency bands (f1, f2, f3). At 350, the first, second, third and fourth antennas 122, 132, 142, 152 transmit and/or receive transmission signals at the respective first, second, third and fourth frequency bands (f1, f2, f3, f4) by carrier aggregation simultaneously.

Alternatively, as discussed above, the third antenna 142 may be tuned to the first frequency band (f1), and the fourth antenna 152 may be tuned to the second frequency band (f2).

By tuning each of the antennas to a respective frequency band, data transmission and/or reception by carrier aggregation is optimized.

Example 1 is a wireless device, comprising a first tunable antenna tuned to a first frequency band; and a second tunable antenna tuned to a second frequency band that is different than the first frequency band, wherein the first and second tunable antennas are configured to transmit, receive, or a combination of transmit and receive transmission signals by carrier aggregation at the respective first and second frequency bands simultaneously.

In Example 2, the subject matter of Example 1 can optionally include a processor configured to perform the carrier aggregation of the received transmission signals.

In Example 3, the subject matter of Example 1 can optionally include a processor configured to perform the carrier aggregation of the transmitted transmission signals.

In Example 4, the subject matter of Example 1 can optionally include a third tunable antenna tuned to a third frequency band that is different from each of the first and second frequency bands; a fourth tunable antenna tuned to a fourth frequency band that is different from each of the first, second and third frequency bands, wherein the first, second, third and fourth tunable antennas are configured to transmit, receive, or a combination of transmit and receive transmission signals by carrier aggregation at the respective first, second, third and fourth frequency bands simultaneously.

In Example 5, the subject matter of Example 1 can optionally include a third tunable antenna tuned to the first frequency band; and a fourth tunable antenna tuned to the second frequency band, wherein the first and third tunable antennas are configured to transmit, receive, or a combination of transmit and receive transmission signals by carrier aggregation at the first frequency band, and the second and fourth tunable antennas are configured to transmit, receive, or a combination of transmit and receive transmission signals at the second frequency band, by carrier aggregation simultaneously.

In Example 6, the subject matter of Example 1 can optionally include that the first tunable antenna is configured to transmit and receive transmission signals, and the second tunable antenna is configured only to receive transmission signals.

In Example 7, the subject matter of Example 1 can optionally include that the first tunable antenna is configured to transmit and receive transmission signals, and the second tunable antenna is configured only to transmit transmission signals.

In Example 8, the subject matter of Example 1 can optionally include that each of the first and second tunable antennas is configured to both transmit and receive transmission signals.

In Example 9, the subject matter of Example 1 can optionally include a third tunable antenna tuned to a third frequency band that is different from each of the first and second frequency bands, wherein the first, second and third tunable antennas are configured to transmit, receive, or a combination of transmit and receive transmission signals by carrier aggregation at the respective first, second and third frequency bands simultaneously.

In Example 10, the subject matter of Example 1 can optionally include a first antenna tuner configured to tune the first antenna dynamically; and a second antenna tuner configured to tune the second antenna dynamically.

Example 11 is a method of operating a wireless device, the method comprising tuning a first antenna to a first frequency band; tuning a second antenna to a second frequency band that is different than the first frequency band; and at least one of transmitting and receiving transmission signals by the first and second antennas at the respective first and second frequency bands by carrier aggregation simultaneously.

In Example 12, the subject matter of Example 11 can optionally include carrier aggregating the received transmission signals.

In Example 13, the subject matter of Example 11 can optionally include carrier aggregating the transmitted transmission signals.

In Example 14, the subject matter of Example 11 can optionally include tuning a third antenna to a third frequency band that is different from each of the first and second frequency bands; tuning a fourth antenna to a fourth frequency band that is different from each of the first, second and third frequency bands; and at least one of transmitting and receiving by the first, second, third and fourth antennas the transmission signals at the respective first, second, third and fourth frequency bands by carrier aggregation simultaneously.

In Example 15, the subject matter of Example 11 can optionally include transmitting and receiving transmission signals by the first antenna; and transmitting only transmission signals from the second antenna.

In Example 16, the subject matter of Example 11 can optionally include transmitting and receiving transmission signals by each of the first and second antennas.

In Example 17, the subject matter of Example 11 can optionally include tuning a third antenna to a third frequency band; and at least one of transmitting and receiving the transmission signals by the first, second and third antennas at the respective first, second and third frequency bands by carrier aggregation simultaneously.

In Example 18, the subject matter of Example 11 can optionally include tuning by a first antenna tuner the first antenna dynamically; and tuning by a second antenna tuner the second antenna dynamically.

Example 19 is a non-transitory computer-readable medium having stored thereon a computer program with a program code for performing, when the program is executed on a computer, a method of operating a wireless device, the method comprising tuning a first antenna to a first frequency band; tuning a second antenna to a second frequency band that is different than the first frequency band; and at least one of transmitting and receiving transmission signals by the first and second antennas at the respective first and second frequency bands by carrier aggregation simultaneously.

In Example 20, the subject matter of Example 19 can optionally include carrier aggregating the received transmission signals.

In Example 21, the subject matter of Example 19 can optionally include carrier aggregating the transmitted transmission signals.

In Example 22, the subject matter of any of Example 1 and 2 can optionally include a processor configured to perform the carrier aggregation of the transmitted transmission signals.

In Example 23, the subject matter of any of Examples 1-3 can optionally include a third tunable antenna tuned to a third frequency band that is different from each of the first and second frequency bands; a fourth tunable antenna tuned to a fourth frequency band that is different from each of the first, second and third frequency bands, wherein the first, second, third and fourth tunable antennas are configured to transmit, receive, or a combination of transmit and receive transmission signals by carrier aggregation at the respective first, second, third and fourth frequency bands simultaneously.

In Example 24, the subject matter of any of Examples 1-3 can optionally include a third tunable antenna tuned to the first frequency band; and a fourth tunable antenna tuned to the second frequency band, wherein the first and third tunable antennas are configured to transmit, receive, or a combination of transmit and receive transmission signals by carrier aggregation at the first frequency band, and the second and fourth tunable antennas are configured to transmit, receive, or a combination of transmit and receive transmission signals at the second frequency band, by carrier aggregation simultaneously.

In Example 25, the subject matter of any of Examples 1-5 can optionally include that the first tunable antenna is configured to transmit and receive transmission signals, and the second tunable antenna is configured only to receive transmission signals.

In Example 26, the subject matter of any of Examples 1-5 can optionally include that the first tunable antenna is configured to transmit and receive transmission signals, and the second tunable antenna is configured only to transmit transmission signals.

In Example 27, the subject matter of any of Examples 1-5 can optionally include that each of the first and second tunable antennas is configured to both transmit and receive transmission signals.

In Example 28, the subject matter of any of Examples 2, 3, and 6-8 can optionally include a third tunable antenna tuned to a third frequency band that is different from each of the first and second frequency bands, wherein the first, second and third tunable antennas are configured to transmit, receive, or a combination of transmit and receive transmission signals by carrier aggregation at the respective first, second and third frequency bands simultaneously.

In Example 29, the subject matter of any of Examples 1-9 can optionally include a first antenna tuner configured to tune the first antenna dynamically; and a second antenna tuner configured to tune the second antenna dynamically.

In Example 30, the subject matter of any of Examples 11-12 can optionally include carrier aggregating the transmitted transmission signals.

In Example 31, the subject matter of any of Examples 11-13 can optionally include tuning a third antenna to a third frequency band that is different from each of the first and second frequency bands; tuning a fourth antenna to a fourth frequency band that is different from each of the first, second and third frequency bands; and at least one of transmitting and receiving by the first, second, third and fourth antennas the transmission signals at the respective first, second, third and fourth frequency bands by carrier aggregation simultaneously.

In Example 32, the subject matter of any of Examples 11-14 can optionally include transmitting and receiving transmission signals by the first antenna; and transmitting only transmission signals from the second antenna.

In Example 33, the subject matter of any of Examples 11-14 can optionally include transmitting and receiving transmission signals by each of the first and second antennas.

In Example 34, the subject matter of any of Examples 11-13, 15 and 16 can optionally include tuning a third antenna to a third frequency band; and at least one of transmitting and receiving the transmission signals by the first, second and third antennas at the respective first, second and third frequency bands by carrier aggregation simultaneously.

In Example 35, the subject matter of any of Examples 11-17 can optionally include tuning by a first antenna tuner the first antenna dynamically; and tuning by a second antenna tuner the second antenna dynamically.

Example 36 is an apparatus substantially as shown and described.

Example 37 is a method substantially as shown and described.

While the foregoing has been described in conjunction with examples, it is understood that these are merely examples, rather than the best or optimal. Accordingly, the disclosure is intended to cover alternatives, modifications and equivalents, which may be included within the scope of the disclosure.

Although specific examples have been illustrated and described herein, it will be appreciated by those of ordinary skill in the art that a variety of alternate and/or equivalent implementations may be substituted for the specific examples shown and described without departing from the scope of the disclosure. This application is intended to cover any adaptations or variations of the specific examples discussed herein.

The invention claimed is:

1. A wireless device, comprising:
   a first tunable antenna tuned to a first frequency band;
   a second tunable antenna tuned to a second frequency band that is different than the first frequency band;
   a third tunable antenna tuned to the first frequency band; and
   a fourth tunable antenna tuned to the second frequency band,
   wherein the first and third tunable antennas are configured to transmit, receive, or a combination of transmit and receive transmission signals at the first frequency, and the second and fourth tunable antennas are configured to transmit, receive, or a combination of transmit and receive transmission signals at the second frequency, with carrier aggregation simultaneously.

2. The wireless device of claim 1, further comprising a processor configured to perform the carrier aggregation of the received transmission signals.

3. The wireless device of claim 1, further comprising a processor configured to perform the carrier aggregation of the transmitted transmission signals.

4. The wireless device of claim 1, wherein the first tunable antenna is configured to transmit and receive transmission signals, and the second tunable antenna is configured only to receive transmission signals.

5. The wireless device of claim 1, wherein the first tunable antenna is configured to transmit and receive transmission signals, and the second tunable antenna is configured only to transmit transmission signals.

6. The wireless device of claim 1, wherein each of the first and second tunable antennas is configured to both transmit and receive transmission signals.

7. The wireless device of claim 1, further comprising:
   a first antenna tuner configured to tune the first antenna dynamically; and
   a second antenna tuner configured to tune the second antenna dynamically.

8. A method of operating a wireless device, the method comprising:
   tuning a first antenna to a first frequency band;
   tuning a second antenna to a second frequency band that is different than the first frequency band;
   tuning a third antenna to the first frequency band;
   tuning a fourth antenna to the second frequency band;
   at least one of transmitting and receiving transmission signals by the first and third antennas at the first frequency band, and the second and fourth antennas at the second frequency band, with carrier aggregation simultaneously.

9. The method of claim 8, further comprising carrier aggregating the received transmission signals.

10. The method of claim 8, further comprising carrier aggregating the transmitted transmission signals.

11. The method of claim 8, further comprising:
    transmitting and receiving transmission signals by the first antenna; and
    transmitting only transmission signals from the second antenna.

12. The method of claim 8, further comprising transmitting and receiving transmission signals by each of the first and second antennas.

13. The method of claim 8, further comprising:
    tuning by a first antenna tuner the first antenna dynamically; and
    tuning by a second antenna tuner the second antenna dynamically.

14. A non-transitory computer-readable medium having stored thereon a computer program with a program code for performing, when the program is executed on a computer, a method of operating a wireless device, the method comprising:
    tuning a first antenna to a first frequency band;
    tuning a second antenna to a second frequency band that is different than the first frequency band;
    tuning a third antenna to the first frequency band;
    tuning a fourth antenna to the second frequency band; and
    at least one of transmitting and receiving transmission signals by the first and third antennas at the first frequency band, and the second and fourth antennas at the second frequency band, with carrier aggregation simultaneously.

15. The non-transitory computer-readable medium of claim 14, further comprising carrier aggregating the received transmission signals.

16. The non-transitory computer-readable medium of claim 14, further comprising carrier aggregating the transmitted transmission signals.

* * * * *